(12) United States Patent
Squires (10) Patent No.: US 11,167,897 B2
(45) Date of Patent: Nov. 9, 2021

(54) CONTAMINANT RESISTANT PRODUCT PACKAGING

(71) Applicant: Charlotte Squires, Spokane, WA (US)

(72) Inventor: Charlotte Squires, Spokane, WA (US)

( * ) Notice: Subject to any disclaimer, the term of this patent is extended or adjusted under 35 U.S.C. 154(b) by 0 days.

(21) Appl. No.: 16/850,914

(22) Filed: Apr. 16, 2020

(65) Prior Publication Data

US 2021/0114786 A1   Apr. 22, 2021

Related U.S. Application Data

(63) Continuation-in-part of application No. 16/655,055, filed on Oct. 16, 2019, now Pat. No. 10,781,018, and a continuation of application No. 16/707,965, filed on Dec. 9, 2019.

(51) Int. Cl.
| | | |
|---|---|---|
| *B65D 53/08* | (2006.01) | |
| *B32B 1/02* | (2006.01) | |
| *B65D 81/20* | (2006.01) | |

(52) U.S. Cl.
CPC ............... *B65D 53/08* (2013.01); *B32B 1/02* (2013.01); *B65D 81/2084* (2013.01); *B32B 2307/31* (2013.01); *B32B 2439/70* (2013.01)

(58) Field of Classification Search
CPC ...... B65D 53/08; B65D 81/2084; B32B 1/02; B32B 2307/31; B32B 2439/70
See application file for complete search history.

(56) References Cited

U.S. PATENT DOCUMENTS

| | | | | |
|---|---|---|---|---|
| 4,672,684 A * | 6/1987 | Barnes | ................... | B65D 31/04 383/45 |
| 5,922,428 A * | 7/1999 | Pufahl | ...................... | C09J 7/30 428/42.1 |
| 6,170,985 B1 * | 1/2001 | Shabram, Jr. | .......... | B65D 33/01 383/100 |
| 7,063,228 B2 * | 6/2006 | Mita | ...................... | B65D 77/02 220/495.03 |
| 8,087,827 B2 * | 1/2012 | Mir | ...................... | A47J 36/027 383/102 |
| 9,016,944 B2 * | 4/2015 | Mir | ...................... | B65D 33/01 383/102 |

(Continued)

OTHER PUBLICATIONS

Zhang et al., "Tuning the gradient structure of highly breathable, permeable, directional waster transport in b-layered Janus fibrous membranes using electrospinning", Royal Society of Chemistry, RSC Adv., 2020, 10, 13529-3538.

*Primary Examiner* — Peter N Helvey
(74) *Attorney, Agent, or Firm* — Mohr Intellectual Property Law Solutions, PC (57) ABSTRACT

A sealable enclosure is disclosed that is configured to enclose an object that is to be heated, wherein heating of the sealable enclosure with the object sealed therein permits gas generated by the heating to vent out through a first micro-pore portion disposed in a fold of film layer. Initially, the generated gas is retained in the sealable enclosure. When the temperature of the strip of heat sensitive adhesive reaches a threshold temperature, the strip of heat sensitive adhesive releases so that fold opens, wherein the gas vents through the micro-pore portion disposed in the film layer out into an ambient region surrounding the sealable enclosure while preventing ambient contaminates in the ambient region from entering into the sealable enclosure.

8 Claims, 8 Drawing Sheets

(56) References Cited

U.S. PATENT DOCUMENTS

| | | | |
|---|---|---|---|
| 2003/0123758 A1* | 7/2003 | Mita | B65D 81/3461 383/38 |
| 2004/0096128 A1* | 5/2004 | Shibata | B65D 77/225 383/101 |
| 2006/0257056 A1* | 11/2006 | Miyake | B65D 77/225 383/103 |
| 2007/0263948 A1* | 11/2007 | Buchman | B65D 33/01 383/103 |
| 2009/0092819 A1* | 4/2009 | Malik | A61K 9/7092 428/305.5 |
| 2014/0233868 A1* | 8/2014 | Knutzon | B65D 31/12 383/40 |
| 2014/0241649 A1* | 8/2014 | Bockmann | B65D 33/01 383/103 |
| 2016/0101916 A1* | 4/2016 | Grijalva Varillas | B32B 5/22 383/102 |
| 2019/0023478 A1* | 1/2019 | Varriano-Marston | B65D 81/3461 |

* cited by examiner

CONTAMINANT RESISTANT PRODUCT PACKAGING

PRIORITY CLAIM

This patent application is a continuation in part application of and claims priority from copending U.S. Non-Provisional patent application Ser. No. 16/655,055 filed Oct. 16, 2019, and entitled, "Contaminant Resistant Product Packaging," and is a continuation in part application of and claims priority from copending U.S. Non-Provisional patent application Ser. No. 16/707,965 filed Dec. 9, 2019, and entitled, "Contaminant Resistant Product Packaging," the contents of which are all hereby incorporated by reference in their entirety.

BACKGROUND

The present disclosure relates generally to product packaging. Known product packaging is not satisfactory for situations where contamination from ambient contaminants is of concern. For example, a gluten free product cannot be baked in an ambient environment that is not entirely free of gluten particles. In such situations where cooking occurs in an ambient environment with gluten contamination, the gluten free product may become contaminated with gluten particles from the ambient environment during baking and/or during handling of the baked product after baking.

As another example, some individuals are highly allergic to peanuts or other particles. When a meal is prepared for such at-risk individuals, special procedures and/or equipment is required for safe food preparation so that the prepared meal is not contaminated with peanut particles.

As yet another example, some non-food product items may need to be heated in a package such that ambient contaminants do not enter the product package during and/or after heating. An example is sterilization of medical equipment.

Accordingly, there exists a need in the product packaging arts for improved product packaging that protects packaged products from contaminants.

SUMMARY

The present disclosure is directed to a sealable enclosure that is configured to enclose an object that is to be heated, wherein heating of the sealable enclosure with the object sealed therein permits gas generated by the heating to vent out through a first micro-pore portion disposed in a fold of film layer. Initially, the generated gas is retained in the sealable enclosure. When the temperature of the strip of heat sensitive adhesive reaches a threshold temperature, the strip of heat sensitive adhesive releases so that fold opens, wherein the gas vents through the micro-pore portion disposed in the film layer out into an ambient region surrounding the sealable enclosure while preventing ambient contaminates in the ambient region from entering into the sealable enclosure.

DETAILED DESCRIPTION

Heating of a sealable enclosure embodiment with an object sealed therein permits gas generated by the heating to vent out from the sealable enclosure into an ambient region surrounding the sealable enclosure while preventing ambient contaminates in the ambient region from entering into the sealable enclosure. The disclosed sealable enclosure embodiments will become better understood through review of the following detailed description in conjunction with the figures. The detailed description and figures merely provide examples of the various invention embodiments described herein. Those skilled in the art will understand that the disclosed example embodiments may be varied, modified, and altered without departing from the scope of the invention as described herein. Many variations are contemplated for different applications, manufacture, and design considerations. However, for the sake of brevity, each and every contemplated variation is not individually described in the following detailed description.

Throughout the following detailed description, examples of various sealable enclosure embodiments are provided. Related features in the example embodiments may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example embodiment.

The following definitions apply herein, unless otherwise indicated. "Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder. "Comprising," "including," and "having" (and conjugations thereof) are used interchangeably to mean including but not necessarily limited to, and are open-ended terms not intended to exclude additional elements or method steps not expressly recited. Terms such as "first", "second", and "third" are used to distinguish or identify various members of a group, or the like, and are not intended to denote a serial, chronological, or numerical limitation. "Coupled" means connected, either permanently or releasably, whether directly or indirectly, through intervening components. "Sealably join" or the like means that two adjacent surfaces are affixed together (sealed together) in a manner such that fluids and/or gasses cannot pass between the two joined surfaces.

Figure 1:
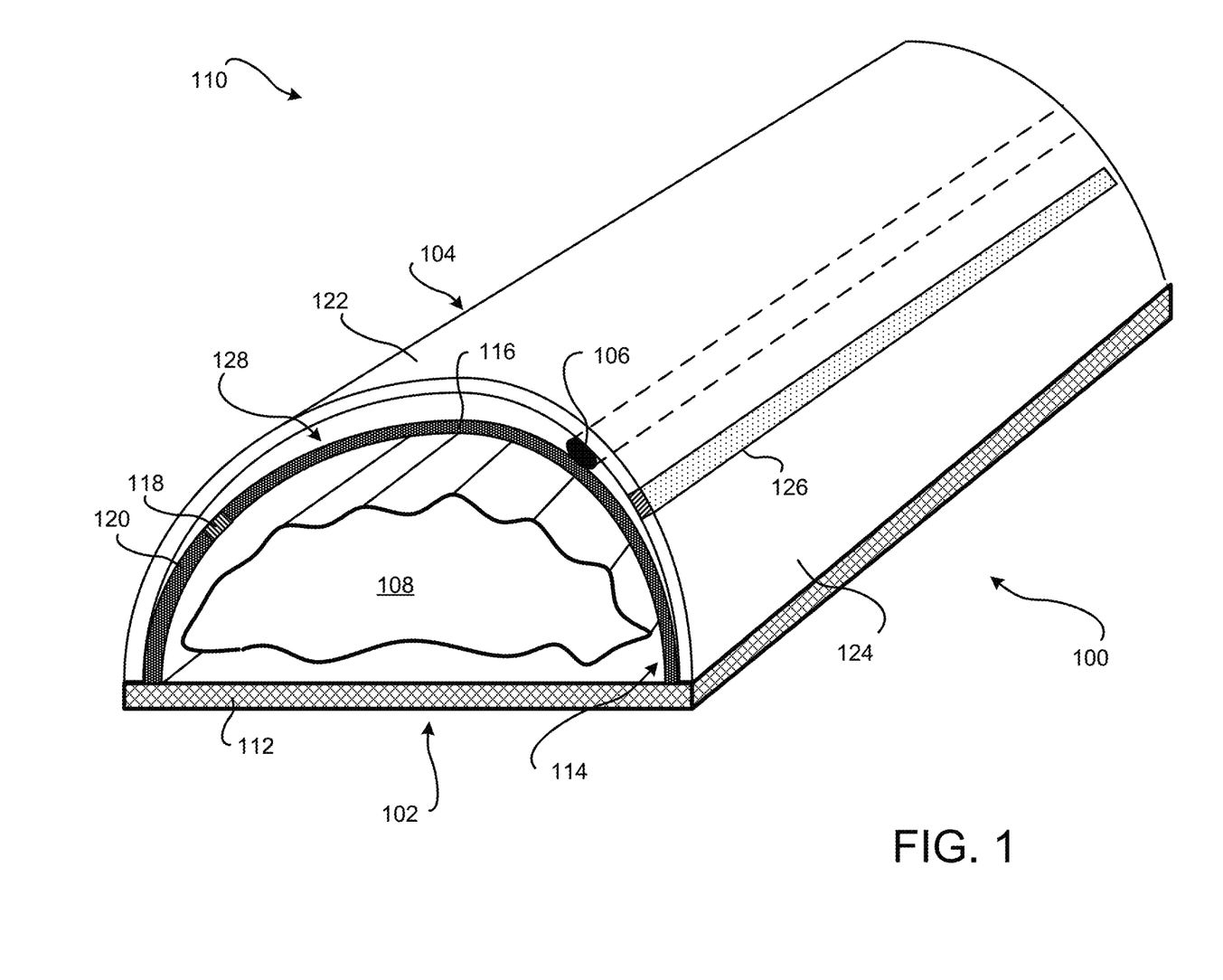
FIG. 1 is a perspective view of a film layer of an example sealable enclosure embodiment.

FIG. 1 is a cross sectional, perspective view of an example embodiment of a sealable enclosure 100. The sealable enclosure 100 comprises three elements: an enclosure 102, a film layer 104 and a strip of heat sensitive adhesive 106. The sealable enclosure 100 is configured to enclose an object 108 that is to be heated while in an ambient region 110. Gas that is generated by the heating of the object 108 is allowed to vent out from the sealable enclosure 100, via a micro-pore portion 118 (interchangeably referred to herein as a micro-perforation portion 118), into the ambient region 110 surrounding the sealable enclosure 100 while preventing ambient contaminates residing in the ambient region 110 from entering into the sealable enclosure 100.

Micro-perforated or micro-pore food packaging is a type of perforated or pore-based packaging that contains micro holes or micro perforations, interchangeably referred to herein as micro-pores, which are mechanically disposed in the fabric of the micro-pore portion 118. The micro holes or perforations enable gas permeation to maintain the rate of respiration of food products. The micro-pore portion 118 is a layer, strip or piece of a material with micro-pores. The micro-pores of the micro-pore portion 118 may be formed in a variety of manners. In some embodiments, the micro-pore portion 118 may be comprised of a fiber-based material, such as a micro-pore textile or fibrous membrane, a micro-pore cellulose textile or fibrous membrane, a nanofiber-based textile or fibrous membrane, a micro-fiber-based textile or fibrous membrane, or the like, that permits transport of liquids (preferably in vapor form) through the micro-pore portion 118. The random arrangement of the fiber density and/or fiber arrangement of the fibers, such as but not limited to cellulose fibers, is used to control the size of the micro-pores or the micro-pore portion 118. For example, but not limited to, various types of micro-pore textiles or fibrous membranes are disclosed in the paper by Zhang et al., "Tuning the gradient structure of highly breathable, permeable, directional waster transport in b-layered Janus fibrous membranes using electrospinning", Royal Society of Chemistry, RSC Adv., 2020, 10, 13529-3538, which is incorporated by reference herein in its entirety.

The micro-pore material of the micro-pore portion 118 may be comprised of other materials. For example, but not limited to, the micro-pore portion 118 may be made of a fabric with micro perforations. Micro-perforation involves the puncturing of packaging films with holes. Micro-perforation may use puncturing, abrasion, or micro-laser energy to generate the micro-perforations (micro-pores) in the micro-pore portion 118.

Another micro-pore portion 118 material may be formed by stretching the crystalline structure of polymers. Formation of micro-pores can be induced by using solvents as well as modification of various polymer composites which dissolve portions of a membrane to form the micro-pores.

The micro-pore portion 118 may have micro-pores ranging from, but not limited to, a diameter of 6 micrometers (μm) to 200 μm, though some diameters may be larger or may be smaller than the disclosed range of diameters so long as particles cannot pass through the pore holes while still permitting flow of gas therethrough. Micro-pore food packaging offers various advantages including extended shelf life and moisture retention of the food products. Embodiments of the sealable enclosure employ the micro-pore portion 118 with micro-pores in a novel manner to prevent contamination from ambient contaminants when the object that is enclosed within the sealable enclosure is heated.

Any process now known or later developed for producing a micro-pore textiles or fibrous membranes of the micro-pore portion 118 are contemplated for use in the various embodiments. Further, any suitable material now known or later developed for producing a micro-pore textiles or fibrous membranes for the micro-pore portion 118 are contemplated for use in the various embodiments. Further, the designed size of the micro-pores of the micro-pore portion 118 may be selected based on the particular type of application that is being used for the sealable enclosure 100. For example, the volume of venting gas generated by the heating of the object 108 may dictate the design size of the micro-pores. Alternatively, or additionally, the heating temperature that is used for heating the object 108 may dictate the design size of the micro-pores. Alternatively, or additionally, characteristics of ambient particles that are to be blocked from entering into the sealable enclosure 100 during the heating process may dictate the design size of the micro-pores. Further, in the various applications, the size of the pores in the micro-pore portion 118 may be controlled based upon the specific application of the sealable enclosure and/or based upon ease of manufacture of the material used for the micro-pore portions 118.

Prior to heating, the object 108 is inserted into the enclosure 102 and then the enclosure 102 is sealed. Any suitable sealing process and/or apparatus may be used to seal the object 108 within the enclosure 102. Further, since the object 108 has been sealed into the enclosure 102, contaminants cannot enter into the inside of the enclosure 102 to contaminate the object 108. For example, prior to heating, the object 108 cannot be contaminated during transportation to the heating site and/or during handling of the sealable enclosure 100 by individuals.

To illustrate a practical application of the use of example sealable enclosure 100 embodiments, the object 108 may be a formed piece of gluten free dough that is to be baked into a gluten free loaf of bread while encased within the sealable enclosure 100. In an example heating application, the ambient region 110 may be the inside of a baking oven. If gluten-based dough has been previously baked within the oven, then residual gluten particles may still reside inside of the oven (the ambient region 110). Embodiments of the sealable enclosure 100 prevent contamination of the gluten free dough (the object 108) by preventing gluten particles in the ambient region 110 from entering into the sealable enclosure 100 during the baking process.

As another application, the object 108 may be a liquid or semi-liquid, like milk or apple sauce, that is to be sterilized. In such applications, the size (diameter) of the micro-pores are defined to prevent liquid from passing through the micro-pores while permitting the generated gas to pass through the micro-pores. As yet another application, the object 108 may be a physical object such as a medical instrument that is to be sterilized in an autoclave.

In the various embodiments, the enclosure 102 comprises a base portion 112 and an upper portion 114. The upper portion 114 comprises a first enclosure barrier portion 116, a micro-pore portion 118, and a second enclosure barrier portion 120. The micro-pore portion 118 is located between the first enclosure barrier portion 116 and the second enclosure barrier portion 120. The base portion 112, the first enclosure barrier portion 116 and the second enclosure barrier portion 120 are impenetrable to the generated gas and the ambient contaminates. The micro-pore portion 118 is configured to permit the gas generated by the heating to initially vent out from the enclosure 102.

The micro-pore portion 118 is a structure, such as layer of film, paper or the like, with a plurality of small diameter holes therein. In a preferred embodiment, the width of the first enclosure barrier portion 116 is substantially larger than the width of the second enclosure barrier portion 120 such that the micro-pore portion 118 is located closer to a selected one of the edges of the upper portion 114. Any suitable size (width and/or length) of the micro-pore portion 118 may be used in the various embodiments. Further, any suitable number of and/or density of micro-pores may be used for the micro-pore portion 118. In some embodiments, the micro-pore portion 118 may comprise multiple discrete micro-pore portions that may reside in selected suitable locations of the upper portion 114.

In some embodiments, the three portions 116, 118, 120 are initially separate structures that are then joined to form the upper portion 114. Depending upon the embodiment, an adhesive may be used to sealably join the edges of the three portions 116, 118, 120. Alternatively, a crimp or other structure may be used to sealably join the edges of the portions 116, 118, 120. A crimp is formed by pressing together one or more folds in the material so that the folded portions are sealably captured together (joined). Alternatively, or additionally, a suitable adhesive can be used to sealably join the edges of the three portions 116, 118, 120. In another embodiment, the edges of the three portions 116, 118, 120 are sealably joined using heat and/or pressure.

In other embodiments, the three portions 116, 118, 120 are formed on a sheet of solid flat material, film, layer, or the like. The micro-pore portion 118 is formed in a selected region on the structure. In a nonlimiting example embodiments, a plurality of micro-pore portions are formed by perforating the structure using a die or a laser.

In some embodiments, the base portion 112 and the upper portion 114 are fabricated from the same piece of material. For example, but not limited to, the enclosure 102 may be a tube of packaging material.

In another embodiment, the base portion 112 may be separate from the upper portion 114, such that the edges of the base portion 112 and the upper portion 114 are joined together in a sealable manner. For example, the base portion 114 may be made from a rigid material that supports the object 108. In contrast, the upper portion 114 may be a flexible or semi-rigid structure to facilitate packaging and/or heating of the object 108. Depending upon the embodiment, an adhesive may be used to sealably join the edges of the base portion 112 and the upper portion 114. Alternatively, a crimp or other structure may be used to sealably join the edges of the base portion 112 and the upper portion 114. In another embodiment, the edges of the base portion 112 and the upper portion 114 are sealably joined using heat and/or pressure.

The film layer 104 comprises a first film barrier portion 122, a second film barrier portion 124, and an intervening micro-pore portion 126. The edges of the film layer 104 are sealably affixed to a portion of the outer surface of the enclosure 102. The first film barrier portion 122 and the second film barrier portion 124 are impenetrable to the generated gas and the ambient contaminates. The micro-pore portion 126 is configured to permit the gas generated by the heating to initially vent out from a cavity 128 that is defined by a portion of the surface of the upper portion 114 and a lower surface of the film layer 104.

Any suitable size (width and/or length) of the micro-pore portion 126 may be used in the various embodiments. Further, any suitable number of and/or density of micro-pores may be used for the micro-pore portion 126. In some embodiments, the micro-pore portion 126 may comprise multiple discrete micro-pore portions that may reside in selected suitable locations of the film layer 104.

In a preferred embodiment, the three portions 122, 124, 126 are formed on a sheet of solid flat material, film, layer, or the like. The micro-pore portion 126 is formed in a selected region on the structure, wherein a plurality of micro-pores are formed. In a nonlimiting example embodiment, the micro-pores are made by perforating the structure using a die or a laser. Alternatively, the micro-pores may be made of a fabric or material made of woven fibers, non-woven fibers, or the like. Preferably, the film layer 104 is made from a flexible or semi-flexible material such that when gasses are generated during the heating of the object 108, gas pressure from the expanding gas can enlarge the cavity 128.

A strip of heat sensitive adhesive 106 runs along the length of the first film barrier portion 122 of the film layer 104 and the first enclosure barrier portion 116 of the upper portion 114. Here, the strip of heat sensitive adhesive 106 extends from the front edge to the back edge of the film layer 104. The strip of heat sensitive adhesive 106 adhesively joins and seals a bottom surface portion of the first film barrier portion 122 to an outside surface portion of the first enclosure barrier portion 116.

During the heating process, one skilled in the art appreciates that gas is generated as increasing temperature within the enclosure 102 causes vaporization of liquids residing within the object 108 and/or residing in the interior of the enclosure 102. As the gas generated in the interior of the enclosure 102 initially vents out through the micro-pore portion 118. The entering gas then expands and enlarges the cavity 128 that is defined by a lower surface of part of the first film barrier portion 122, the corresponding outer surface portion of the upper portion 114, and the strip of heat sensitive adhesive 106. At this juncture of the heating process, the strip of heat sensitive adhesive 106 that binds the lower surface of the first film barrier portion 122 of the film layer 104 with the outer surface of the corresponding first enclosure barrier portion 116 of the upper portion 114 prevents the expanding gas in the cavity 128 from venting out through the micro-pore portion 126 of the film layer 104.

Because the heat sensitive adhesive 106 binds the lower surface of the first film barrier portion 122 of the film layer 104 with the outer surface of the corresponding first enclosure barrier portion 116, an unexpected benefit is that no contaminates from the ambient region 110 are able to enter into the cavity 128, thereby preventing the object 108 from becoming contaminated. That is, at this juncture in the heating process, it is not possible for the object 108 to become contaminated since the strip of heat sensitive adhesive 106 acts as an impenetrable barrier between the object 108 and the ambient region 110.

As the heating process continues the temperature of the strip of heat sensitive adhesive 106 increases. When the temperature of the strip of heat sensitive adhesive 106 reaches a predefined threshold temperature, the strip of heat sensitive adhesive 106 releases such that the lower surface of the first film barrier portion 122 of the film layer 104 separates from the outer surface of the corresponding first enclosure barrier portion 116 of the upper portion 114. Accordingly, the pressurized gas in the cavity 128 then vents out from the cavity 128 through the micro-pore portion 126 of the film layer 104. Since the gas pressure of the cavity 128 exceeds the pressure of the ambient region 110, contamination particles that may reside in the ambient region 110 are not able to enter into the cavity 128 because there is no air inflow from the ambient region 110 into the cavity 128. Accordingly, the object 108 cannot become contaminated during the heating process since such contaminates cannot pass through the micro-pore portions 118, 126 to enter into the interior of the enclosure 102.

In the various embodiments, the threshold temperature at which the strip of heat sensitive adhesive 106 releases is a temperature that is higher than the temperature at which gas is generated within the enclosure 102. Returning to the example of baking gluten free dough, one skilled in the art appreciates that the dough typically is baked in an oven at a temperature of between 325° F. (degrees Fahrenheit) and 425° F. Further, water is known to change from a liquid state to a gas state at a temperature of 212° F. Thus, as the temperature of the dough begins to exceed 212° F., the dough begins to release steam (gas) and/or other gasses into the interior region of the enclosure 102. The steam and/or gas vents through the micro-pore portion 118 into the cavity 128. As the gas pressure increases and the temperature of the strip of heat sensitive adhesive 106 increases to the predefined threshold temperature, the strip of heat sensitive adhesive 106 begins to release. The steam and/or gas then vents through the micro-pore portion 126 out into the ambient region 110.

In the various embodiments, any suitable material may be used for the components of the sealable enclosure 100. Such materials include, but are not limited to, plastic, cellophane, cardboard, paper, polyethylene, polypropylene, metal, composites, or the like that are suitable for withstanding higher temperatures. Depending upon design choice and the nature of the object 108 that is to be enclosed within the sealable enclosure 100, the various components may be made of a rigid material, a semi-rigid material, a flexible material, and/or a semi-flexible material.

Furthermore, the predefined threshold temperature that the strip of heat sensitive adhesive 106 releases may be defined based on the type and/or characteristics of the adhesive material. Any suitable material may be used for the strip of heat sensitive adhesive 106.

Figure 2:
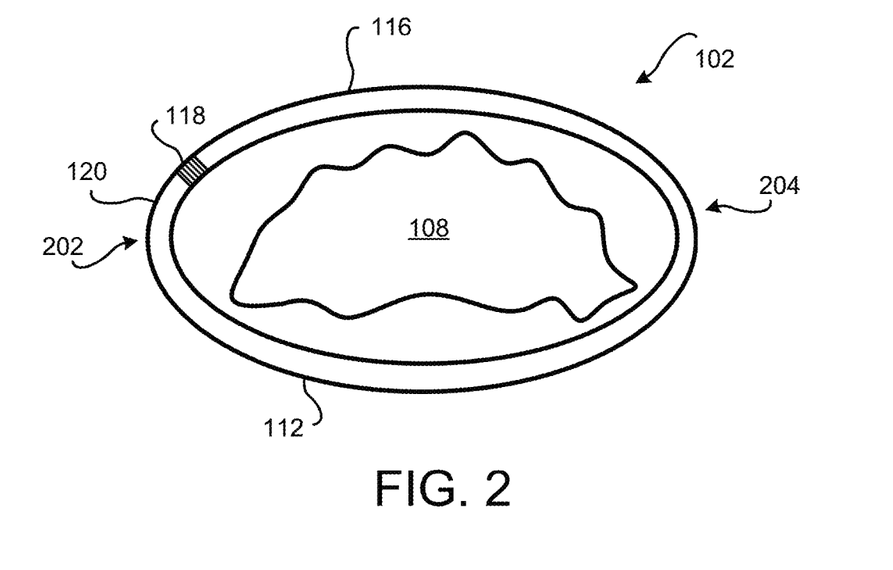
FIG. 2 is a cross sectional view of an example embodiment of the enclosure portion of an example sealable enclosure embodiment.

FIG. 2 is a cross sectional view of an example embodiment of the enclosure 102 portion of an example sealable enclosure embodiment 100. In this example embodiment, the enclosure 102 is fabricated as a tube that is configured to receive the object 108. Once the object 108 has been inserted into the tubular enclosure 102, the ends of the enclosure 102 may be sealed using any suitable process.

Figure 3:
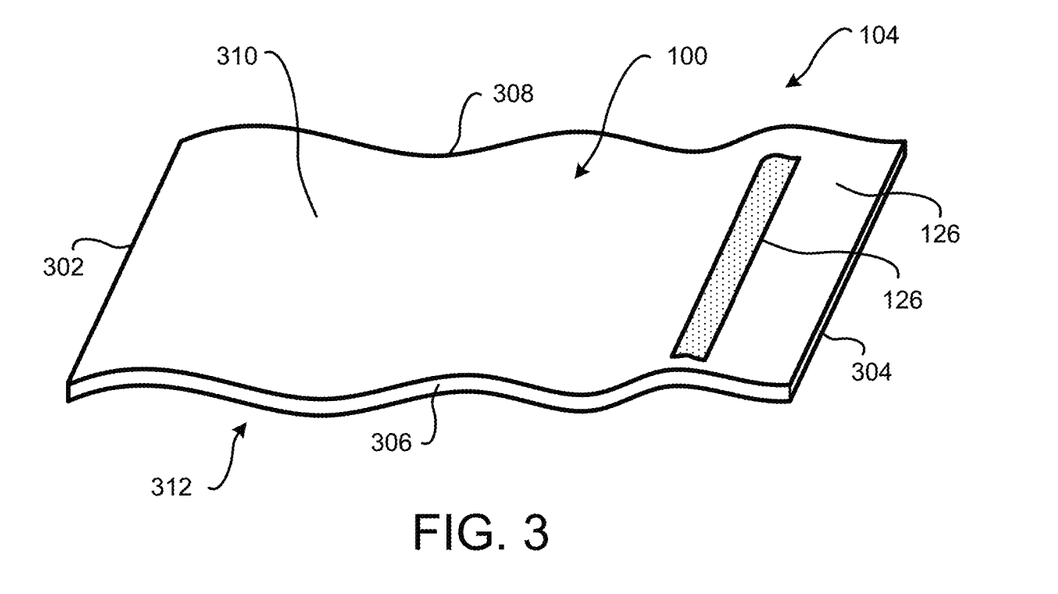
FIG. 3 is perspective view of the top surface of an example film layer of an example sealable enclosure embodiment.

FIG. 3 is perspective view of the top surface of an example film layer 104 of an example sealable enclosure embodiment 100. In this example embodiment, the film layer 104 is a flexible layer that is affixed to the tubular enclosure 102 illustrated in FIG. 2. In this example embodiment, edges of the film layer 104 may be affixed to the enclosure 102 generally at locations 202 and 204 (FIG. 2) on the tubular enclosure 102. In other embodiments, the film layer 104 may be affixed to other forms of an enclosure 102 embodiment.

The film layer 104 is defined by a first side edge 302, a second side edge 304, a front edge 306, a back edge 308, an upper surface 310 and a lower surface 312. The first side edge 302 is sealably affixed to the enclosure 102 at a selected location 202 (FIG. 2). The second side edge 304 is sealably affixed to the enclosure 102 at a selected location 204 (FIG. 2). After insertion of the object 108 into the enclosure 102, the front edge 306 and the back edge 306 may be sealably joined with the ends of the tubular enclosure 102 when the object 108 is sealed into the enclosure 102. Alternatively, the front edge 306 may be sealably joined to a selected outer surface region of the second enclosure barrier portion 120 of the enclosure 102 and the back edge 306 may be sealably joined to a selected outer surface region of the first enclosure barrier portion 116 of the enclosure 102 such that the film layer 104 covers the outer surface region of the first enclosure barrier portion 116, the micro-pore portion 118, and the second enclosure barrier portion 120 portion of the enclosure 102. Here, the micro-pore portion 118 of the enclosure 102 is proximate to the first edge 302 of the film layer 104.

In practice, the strip of heat sensitive adhesive 106 may be affixed to the bottom surface 308 of the film layer 104 prior to affixing the film layer 104 to the enclosure 102. In other embodiments, the strip of heat sensitive adhesive 106 may be inserted between the enclosure 102 and the film layer 104 at a desired location after the film layer 104 has been affixed to the enclosure 102.

Figure 4:
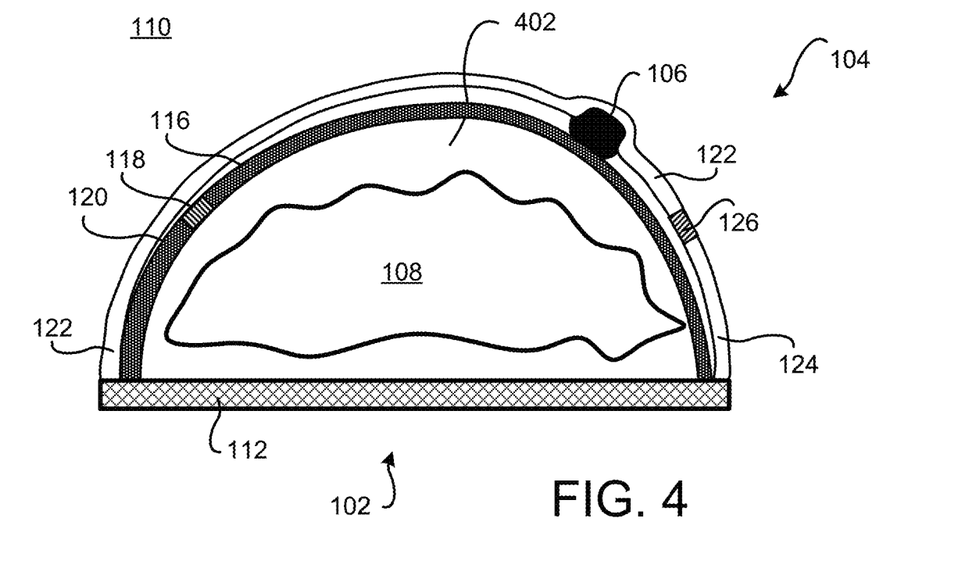
FIG. 4 is a cross sectional view of an example sealable enclosure embodiment before heating.

FIG. 4 is a cross sectional view of an example sealable enclosure embodiment before the heating of the object 108. In this simplified hypothetical example, the film layer 104 is illustrated for convenience as a flexible film layer that is collapsed onto the outside surface of the upper portion 114 (FIG. 1). Accordingly, the cavity 128 has not yet been formed by the generated gasses that will be venting out through the micro-pore portion 118 during the heating process. In other applications, such as when the film layer 104 is a semi-flexible, semi-rigid or rigid material, the cavity 128 may be present but at a pressure that is the same as, or substantially the same as, the ambient pressure.

Figure 5:
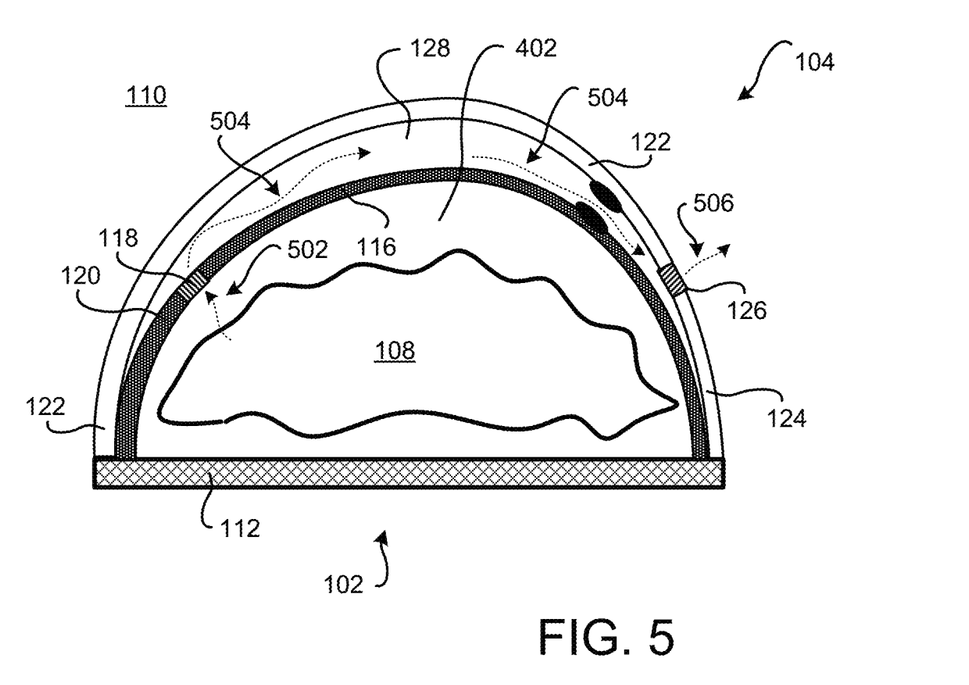
FIG. 5 is a cross sectional view of an example sealable enclosure embodiment during the heating and gas venting process.

FIG. 4 also illustrates the first film barrier portion 122 collapsed around the strip of heat sensitive adhesive 106. Accordingly, one skilled in the art appreciates that there are no separation type forces being exerted on the first film barrier portion 122 of the film layer 104 that would otherwise tend to separate or release the strip of heat sensitive adhesive 106. FIG. 5 is a cross sectional view of an example sealable enclosure embodiment during the heating and the gas venting process.

As the sealable enclosure 100 with the enclosed object 108 is heated, the temperature of the sealable enclosure 100 and the object 108 begins to increase. Returning to the example of baking gluten free dough, one skilled in the art appreciates that the gluten free dough enclosed in the sealable enclosure 100 is placed into a pre-heated oven for baking, typically at a baking temperature of between 325° F. (degrees Fahrenheit) and 425° F., or other customary baking temperatures which may be higher or lower than the described range. As the temperature of the gluten free dough increases during the baking process, water within the gluten free dough changes from a liquid state to a gas state (steam) and begins to fill the region 402 within the interior of the enclosure 102. At some point, the generated steam begins to pass through the micro-pore portion 118 and into the cavity 128, as conceptually illustrated in FIG. 5 by the arrow 502.

As the pressure of the generating gas increases as more gas is released from the object 108, gas pressure increases in the interior region 402 of the enclosure 102. Since the pressure of the cavity 128 tends to equalize with the gas pressure of the interior region 402 of the enclosure 102, gas flows through the micro-pore portion 118 into the cavity 128. The increasing pressure in the cavity 128 tends to expand the film layer 104 such that the film layer 104 extends to its maximum limits. At this juncture, the temperature of strip of heat sensitive adhesive 106 is less than the predefined threshold temperature at which the strip of heat sensitive adhesive 106 releases.

When the film layer 104 has expanded to its maximum extent, gas pressure will begin to increase in the cavity 128 and the interior region 402 of the enclosure 102. Meanwhile, temperature of the strip of heat sensitive adhesive 106 is increasing. At some juncture, the increasing gas pressure in the cavity 128 (which exerts a separation force on the strip of heat sensitive adhesive 106) and the increasing temperature of the strip of heat sensitive adhesive 106 will reach a point where the strip of heat sensitive adhesive 106 releases. That is, the increasing gas pressure and the increasing temperature (when the temperature of the strip of heat sensitive adhesive 106 reaches the predefined threshold temperature) allows the strip of heat sensitive adhesive 106 to release so that the bottom surface of the first film barrier portion 122 of the film layer 104 separates from the upper surface of the first enclosure barrier portion 116 of the enclosure 102, as conceptually illustrated in FIG. 5.

With the release of the strip of heat sensitive adhesive 106, a passage way from the cavity 128 to the micro-pore portion 126 of the film layer 104 is created, Accordingly, gas flows from the cavity 128, as conceptually illustrated by the arrows 504, through the micro-pore portion 126 and out into the ambient region 110, as conceptually illustrated by the arrow 506. Since the gas is passing from the cavity 128 through the micro-pore portion 126, the flow of gas prevents any contaminants in the ambient region from flowing in the opposite direction through the micro-pore portion 126 and into the cavity 128. That is, at this juncture, it is not possible for contaminants to enter into the sealable enclosure 100 to contaminate the object 108.

For convenience, the released strip of heat sensitive adhesive 106 is conceptually illustrated as having a portion adhering to the bottom surface of the first film barrier portion 122 of the film layer 104 and another portion that adheres to the upper surface of the first enclosure barrier portion 116 of the enclosure 102. Depending upon the selection of the materials and surface conditions of the first film barrier portion 122 and the first enclosure barrier portion 116, and the material characteristics of the strip of heat sensitive adhesive 106, the release of the strip of heat sensitive adhesive 106 may be different from the illustrated separation of FIG. 5. In some applications, the entirety (or substantially all of) the strip of heat sensitive adhesive 106 may adhere to the first film barrier portion 122 of the film layer 104 after the release. Alternatively, the entirety (or substantially all of) the strip of heat sensitive adhesive 106 may adhere to the first film barrier portion 122 of the enclosure 102.

In some applications, after the heating of the object has been completed, the generation of additional gas ceases. The sealable enclosure 100 may then be moved into a cooling environment so that the sealable enclosure 100 and the object 108 begin to cool. Preferably, the cooling environment is free of contaminants. Alternatively, the heat source may be removed such that the sealable enclosure 100 and the object 108 therein begin to cool.

Depending upon the embodiment, the structure of the sealable enclosure 100 may change as the cooling process proceeds. In one type of embodiment wherein the film layer 104 and the upper portion 114 (FIG. 1) of the enclosure 102 is flexible, the film layer 104 and the upper portion 114 may collapse as the pressure within the cavity 128 and the interior region 402 decreases as a result of cooling gas within the cavity 128. Even if some contaminants do flow through the micro-pore portion 126 into the cavity 128, the distance between the micro-pore portion 118 and the micro-pore portion 126 may be so great as to make it impossible, or very unlikely, that any contaminates entering in through the micro-pore portion 126 are able to travel so far as to reach and then pass through the micro-pore portion 118 to contaminate the object 108.

In other embodiments, the strip of heat sensitive adhesive 106 may be operable to re-seal itself such that the lower surface of the first film barrier portion 122 of the film layer 104 again is affixed to the first enclosure barrier portion 116 of the upper portion 114. Here, the strip of heat sensitive adhesive sealably re-joins the first film barrier portion from the outer surface region of the enclosure barrier portion. Accordingly, the strip of heat sensitive adhesive 106 again acts as a barrier to any contaminants reaching the object 108. Such embodiments may be particularly useful for sterilization of foods, medical instruments, or other objects.

In some embodiments, the film layer 104 and/or the upper portion 114 of the enclosure 102 may be fabricated from semi-flexible, semi-rigid, and/or rigid materials such that the bottom surface of the upper portion 114 of the enclosure 102 does not collapse onto the object 108. Such embodiments may be desirable in situations such as baking bread or deserts wherein contact of the upper portion 114 of the enclosure 102 might damage the heated object 108.

Figure 6:
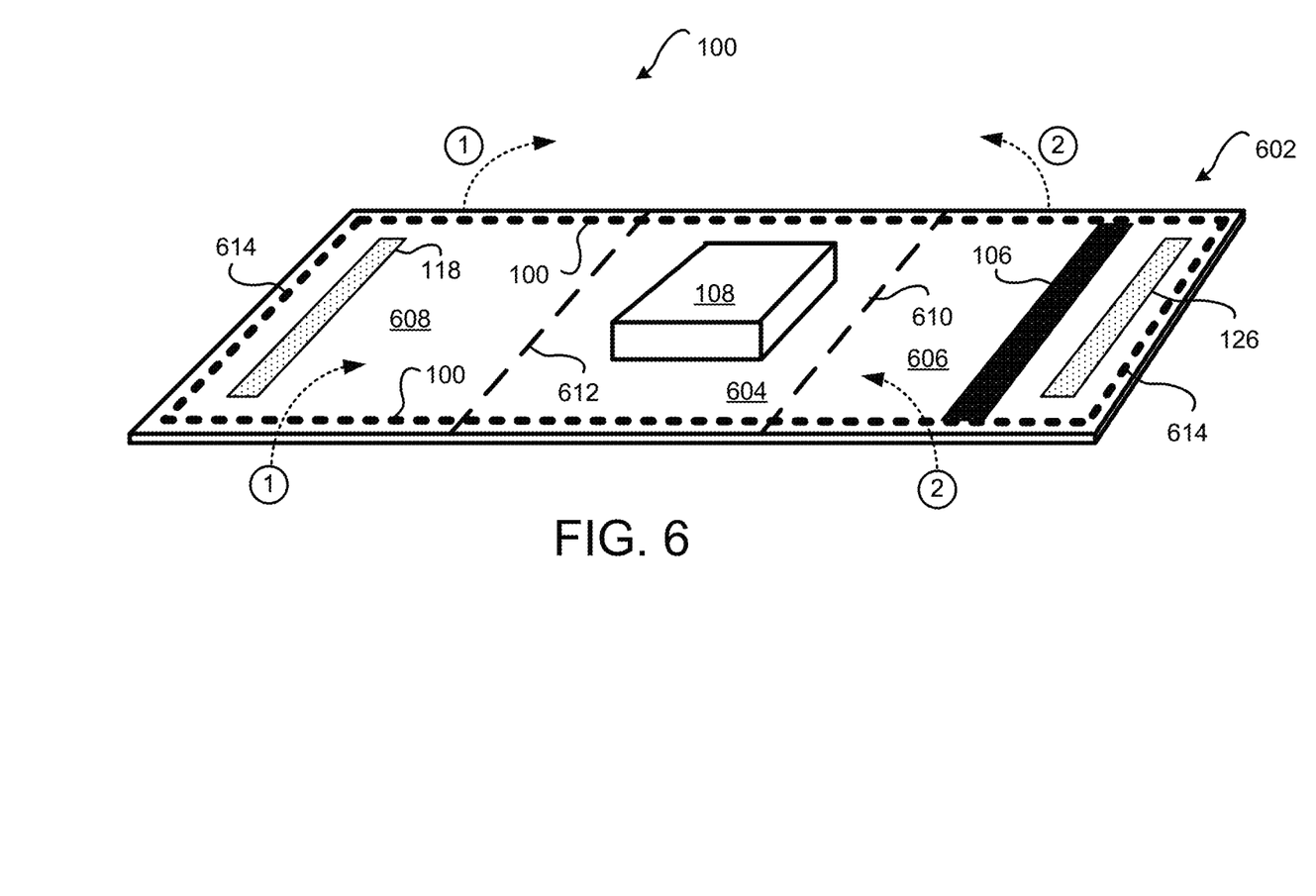
FIG. 6 is a perspective view of a single sheet of packaging with two micro-pore portions that can be folded and sealed to form a sealable enclosure embodiment.

FIG. 6 is a perspective view of a single sheet 602 of packaging with two micro-pore portions 118, 126. The sheet 602 can be folded and sealed to form a sealable enclosure embodiment. The sheet 602 is divided into a middle section 604 and two end sections 606 and 608. The middle section 604 and the first end section 606 are separated by a fold line 610. Similarly, the middle section 604 and the second end section 608 are separated by a fold line 612. The size of the individual sections 604, 606, and 608 may be defined based on the nature of the object 108 that is to be sealably enclosed within the sealable enclosure 100.

During fabrication, the micro-pores are formed in the sheet 602 to create the two micro-pore portions 118, 126. Then, the strip of heat sensitive adhesive 106 is affixed along the length of the section 606. After the object 108 is placed on the middle section 604, the end section 608 is then folded over the object 108 (conceptually denoted by the arrows 1) along the fold 612. Then, the end section 606 is folded along the fold 610 over the object 108 (conceptually denoted by the arrows 2) covering the previously folded section 608. The edges of the sealable enclosure 100 are then sealed together (along the lines 614) such that the strip of heat sensitive adhesive 106 affixes the now-lower surface of the section 606 to the now-upper surface of the section 608. Accordingly, the object 108 is sealed inside the sealable enclosure 100 and the strip of heat sensitive adhesive 106 now acts as a barrier to contaminants.

Figure 7:
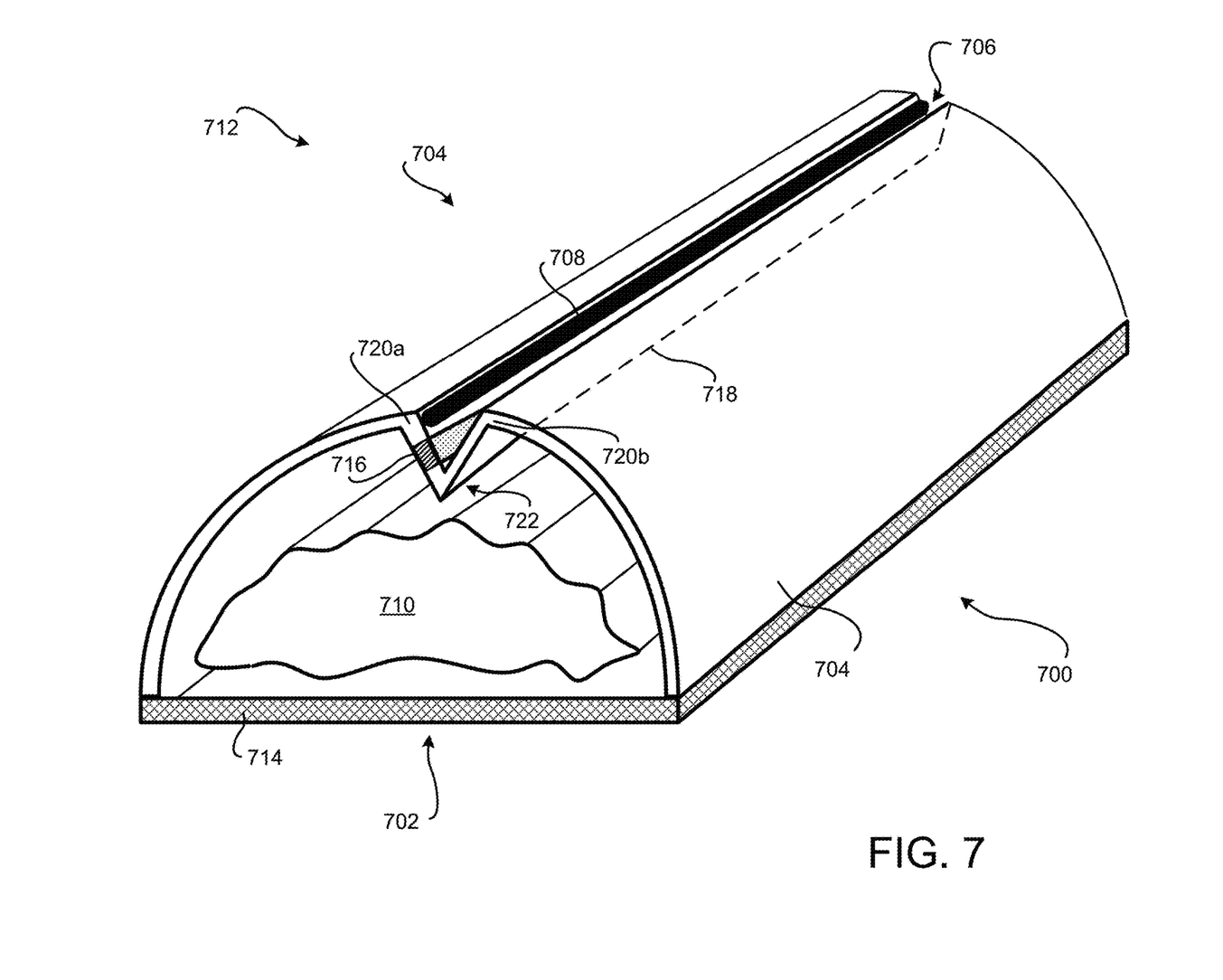
FIG. 7 is a perspective view of an example sealable enclosure embodiment.

FIG. 7 is a cross sectional, perspective view of an example embodiment of a sealable enclosure 700. The sealable enclosure 700 comprises an enclosure 702 defined by a film layer 704 with a fold 706 and a strip of heat sensitive adhesive 708. In an example embodiment, the fold 706 may be envisioned as a simple "V" shaped fold, though any type of fold shape may be used in the various embodiments.

The film layer 704 is disposed on an upper portion of the sealable enclosure 700. Preferably, the film layer 704 is made of a flexible, semi-flexible, or semi-rigid material to enable opening of the fold 706 during the heating process.

The sealable enclosure 700 is configured to enclose an object 710 that is to be heated while in an ambient region 712. Gas that is generated by the heating of the object 710 is allowed to vent out from the sealable enclosure 700 into the ambient region 712 surrounding the sealable enclosure 700 while preventing ambient contaminates residing in the ambient region 712 from entering into the sealable enclosure 700.

Prior to heating, the object 710 is inserted into the enclosure 702 and then the enclosure 702 is sealed. Any suitable sealing process and/or apparatus may be used to seal the object 710 within the enclosure 702. Further, since the object 710 has been sealed into the enclosure 702, contaminants cannot enter into the inside of the enclosure 702 to contaminate the object 710. For example, prior to heating, the object 710 cannot be contaminated during transportation to the heating site and/or during handling of the sealable enclosure 700 by individuals.

To illustrate a practical application of the use of example sealable enclosure 700 embodiments, the object 710 may be a formed piece of gluten free dough that is to be baked into a gluten free loaf of bread while encased within the sealable enclosure 700. In some application, the object 710 may be frozen to facilitate handling, to facilitate transportation to the site of use, and/or to facilitate preservation of the object 710. In an example heating application, the ambient region 712 may be the inside of a baking oven. If gluten-based dough has been previously baked within the oven, then residual gluten particles may still reside inside of the oven (the ambient region 712). Embodiments of the sealable enclosure 700 prevent contamination of the gluten free dough (the object 710) by preventing gluten particles in the ambient region 712 from entering into the sealable enclosure 700 during the baking process.

As another application, the object 710 may be a liquid or semi-liquid, like milk or apple sauce, that is to be sterilized. In such applications, the size (diameter) of the micro-pores are defined to prevent liquid from passing through the micro-pores while permitting the generated gas to pass through the micro-pores. As yet another application, the object 710 may be a physical object such as a medical instrument that is to be sterilized in an autoclave.

In some embodiments, the enclosure 702 comprises a base portion 714 and the film layer 704. The fold 706 is disposed in a selected location along a length of the film layer 704. In the various embodiments, the fold 706 may be located at any desired location, any desired length, any desired orientation, and may be of any desired size and/or shape. The fold 706 is defined by a fold line 718 and two upper fold edges 720a, 720b. A strip of heat sensitive adhesive 708 extends along a length of the two upper fold edges 720a, 720b of the fold 706 so as to be disposed just below and proximate to the two upper fold edges 720a, 720b. The strip of heat sensitive adhesive 708 sealably affixes the two upper fold edges 720a, 720b together.

A micro-pore portion 716 is located between the fold line 718 and the strip of heat sensitive adhesive 708. The base portion 714 and the upper enclosure portion are impenetrable to the generated gas and the ambient contaminates. The micro-pore portion 716 is configured to permit the gas generated by the heating to initially vent out from the enclosure 702. One skilled in the art appreciates that the embodiment shown in FIG. 7 illustrates the open fold 706 after the strip of heat sensitive adhesive 708 has released during the heating process.

The micro-pore portion 716 is a structure, such as layer of film, paper or the like, with a plurality of small diameter holes therein. Any suitable size (width and/or length) of the micro-pore portion 716 may be used in the various embodiments. Further, any suitable number of micro-pores may be used for the micro-pore portion 716. In some embodiments, the micro-pore portion 716 may comprise multiple discrete micro-pore portions residing in suitable locations of the film layer 704.

In some embodiments, the micro-pore portion 716 is formed in a selected region on the film layer 704. A plurality of micro-pore portions may be formed. The micro-pore portion 716 may be a layer, strip or piece of a material with micro-pores. The micro-pores of the micro-pore portion 716 may be formed in a variety of manners as described herein that are used to form the micro-pore portion 118.

During the heating process, in some embodiments, the gas vents out through the micro-pore portion 716 into a cavity region 722 in the fold 706 formed between the fold line 718 of the fold and the strip of heat sensitive adhesive 708.

In some embodiments, the base portion 714 and the film layer 704 are fabricated from the same piece of material. For example, but not limited to, the enclosure 702 may be a tube of packaging material, wherein the fold is formed by folding a portion of the tube of the packaging material.

In another embodiment, the base portion 714 may be separate from the film layer 704, such that the edges of the base portion 714 and the film layer 704 are joined together in a sealable manner. For example, the base portion 714 may be made from a rigid material that supports the object 710. In contrast, the film layer 704 may be a flexible, semi-flexible, or semi-rigid structure to facilitate packaging and/or heating of the object 710. Depending upon the embodiment, an adhesive may be used to sealably join the edges of the base portion 714 and the film layer 704. Alternatively, a crimp, a suitable adhesive, or other structure may be used to sealably join the edges of the base portion 714 and the film layer 704. In another embodiment, the edges of the base portion 714 and the film layer 704 are sealably joined using heat, a suitable adhesive, and/or pressure.

In a preferred embodiment, the strip of heat sensitive adhesive 708 runs along the top portion along the length of the fold 706. In some embodiments, the strip of heat sensitive adhesive 708 extends from the front edge to the back edge of the film layer 704 when the fold 706 extends to the edges of the film 704. The strip of heat sensitive adhesive 708 adhesively joins and seals the top of the fold 706 (proximate to the two upper fold edges 720a, 720b) prior to the heating process.

Figure 8:
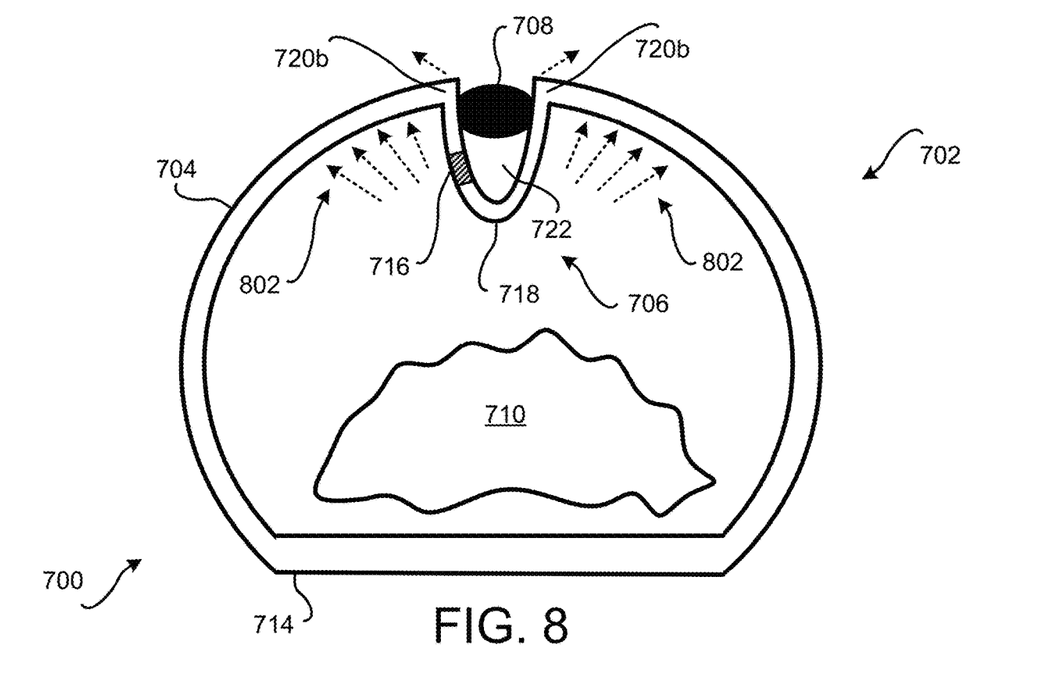
FIG. 8 is a cross sectional view of the example embodiment shown in FIG. 7 prior to heating.

FIG. 8 is a cross sectional view of the example embodiment shown in FIG. 1 prior to heating to conceptually illustrate that the strip of heat sensitive adhesive 708 adhesively joins and seals the top regions of the fold 706 proximate to the two upper fold edges 720a, 720b. During the heating process, one skilled in the art appreciates that gas is generated as increasing temperature within the enclosure 702 causes vaporization of liquids residing within the object 710 and/or residing in the interior of the enclosure 702. The generated gas in the interior of the enclosure 702 expands the enclosure 702, thereby generating outward directed forces (conceptually illustrated by the dashed arrows 802) that would tend to open the fold 706. Also, pressure within the cavity region 722 generated from the venting gas may exert an additional separation force tending to separate the fold 706.

However, during the initial stages of heating, the strip of heat sensitive adhesive 708 acts to prevent the opening of the fold 706. Because the heat sensitive adhesive 708 binds top portions of the fold 706 along the two upper fold edges 720a, 720b, an unexpected benefit is that no contaminates from the ambient region 712 (FIG. 7) are able to enter into the interior of the enclosure 702 during the initial stages of the heating process, thereby preventing the object 710 from becoming contaminated. That is, at this juncture in the heating process, it is not possible for the object 710 to become contaminated since the strip of heat sensitive adhesive 708 sealing the two upper fold edges 720a, 720b of the fold acts as an impenetrable barrier, or a substantially impenetrable barrier, between the object 710 and the ambient region 712.

As the heating process continues, the temperature of the strip of heat sensitive adhesive 708 increases. At some point during the heating process, the temperature of the strip of heat sensitive adhesive 708 reaches its predefined release temperature. When the temperature of the strip of heat sensitive adhesive 708 reaches a predefined threshold temperature, the strip of heat sensitive adhesive 708 releases, and the outward directed forces 802 tend to open up the fold 706 such that the micro-pore portion 716 then becomes exposed to the ambient region 712 (FIG. 7).

After the strip of heat sensitive adhesive 708 releases the two upper fold edges 720a, 720b and the fold 706 opens, the gas generated in the interior of the enclosure 702 vents out through the micro-pore portion 716 into the ambient region 712. The venting gas (venting outward into the ambient region 712), and the associated gas pressure within the sealable enclosure 700 (which is greater than the pressure of the ambient region 712), prevents any contaminants that may be in the ambient region 712 from entering into the interior of the enclosure 702. When the heating process is complete, the sealable enclosure 700 may be moved to a contaminant free, or substantially contaminant free, area for cooling.

In the various embodiments, the threshold temperature at which the strip of heat sensitive adhesive 708 releases is a temperature that is higher than the temperature at which gas is generated within the enclosure 702. Returning to the example of baking gluten free dough, one skilled in the art appreciates that the dough typically is baked in an oven at a temperature of between 325° F. (degrees Fahrenheit) and 425° F. Further, water is known to change from a liquid state to a gas state at a temperature of 212° F. Thus, as the temperature of the dough begins to exceed 212° F., the dough begins to release steam (gas) into the interior region of the enclosure 702. As the gas pressure increases and the temperature of the strip of heat sensitive adhesive 708 increases to the predefined threshold temperature, the strip of heat sensitive adhesive 708 begins to release. The fold 706 opens and the steam (gas) then vents through the micro-pore portion 716 out into the ambient region 712.

In the various embodiments, any suitable material may be used for the components of the sealable enclosure 700. Such materials include, but are not limited to, plastic, cardboard, paper, polyethylene, polypropylene, polymer composites, metal, cellulosic membranes, or the like. Depending upon design choice and the nature of the object 710 that is to be enclosed within the sealable enclosure 700, the various components may be made of a rigid material, a semi-rigid material, a flexible material, and/or a semi-flexible material. The various packaging materials preferably withstand heating temperatures in excess of the above-described baking temperatures (e.g. 425° F.), and may be reliably processed using suitable thermoforming packaging machines with high efficiency. An example packaging material is the Multi-Cook™ heat-resistant film, provided by MULTIVAC, which is an ovenproof pack used for cooking food. MultiCook™ is suitable for foods that contain protein, such as meat, fish and poultry, as well as vegetables and convenience foods. Any suitable material now known or later developed are intended to be within the scope of this disclosure.

Furthermore, the predefined threshold temperature that the strip of heat sensitive adhesive 708 releases may be defined based on the type and/or characteristics of the adhesive material. Any suitable material may be used for the strip of heat sensitive adhesive 708.

One skilled in the art appreciates that the various packaging materials used by the various embodiments may be semi-permeable on a microscopic level. However, embodiments employ packaging materials that preferably act as a barrier to the generated gases and particle contaminates, such that the generated gas vents through the micro-pore portion 716 after the strip of heat sensitive adhesive 708 releases and the fold opens.

Figure 9:
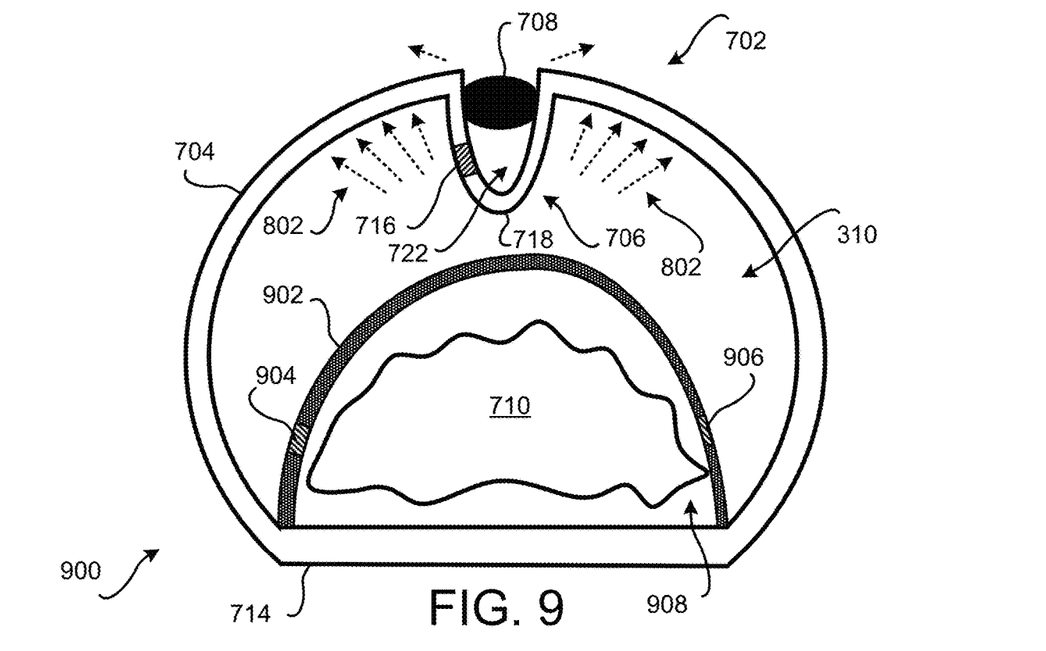
FIG. 9 is a cross sectional view of an example first alternative embodiment before release of strip of heat sensitive adhesive during the heating process.

FIG. 9 is a cross sectional view of an example first alternative embodiment of a sealable enclosure 900 before release of strip of heat sensitive adhesive 708 during the heating process. In this example embodiment, the enclosure 702 comprises the base portion 714, the upper film layer 704, and an intermediate layer 902 disposed between the film layer 704 and the base portion 714. The object 710 is placed between the base portion 714 and the intermediate layer 902.

In the various embodiments, the intermediate layer 902 may be fabricated from semi-flexible, semi-rigid, and/or rigid materials such that the bottom surface of the intermediate layer 902 does not collapse onto the top surface of the object 710. Such embodiments may be desirable in situations such as baking bread or deserts wherein contact of the intermediate layer 902 might damage the heated object 710

The intermediate layer 902 comprises at least one micro-pore portion 904. Alternatively, the intermediate layer 902 may have a plurality of micro-pore portions, such as the illustrated second micro-pore portion 904. The micro-pore portions 904, 906 may be located in any desirable location in the intermediate layer 902. The other portions of the intermediate layer 902 are impenetrable to the generated gas and the ambient contaminates. Alternative embodiments may have any suitable number of micro-pore portions of any suitable size and/or shape that are located at any desirable location in the intermediate layer 902.

The micro-pore portions 904, 906 are configured to permit the gas generated by the heating to initially vent out from a first interior region 908 into the enclosure 702 that is created by the base portion 714 and the intermediate layer 902 (where the object 710 resides). At some point during the heating process, the generated gases vent through the micro-pore portions 904, 906 into a second interior region 310 that is between the intermediate layer 902 and the film layer 704. During this stage of the heating process, the venting gas is retained within the second interior region 310. Eventually, as the temperature rises, the strip of heat sensitive adhesive 708 that seals the fold 706 releases and the fold 706 opens so that the gas that has vented into the second interior region 310 vents through the micro-pore portion 716.

Figure 10:
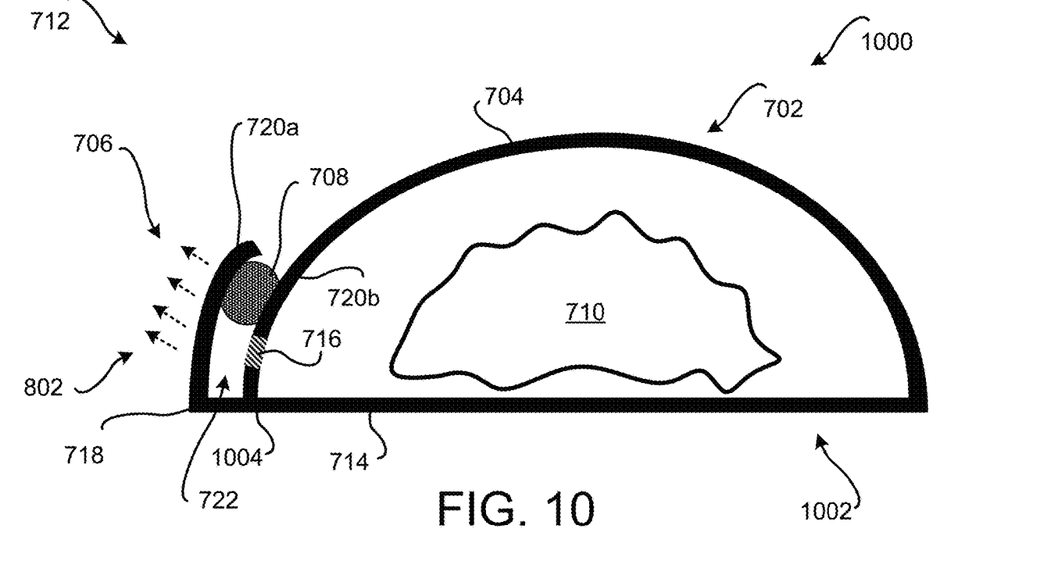
FIG. 10 is a cross sectional view of an example second alternative embodiment before release of strip of heat sensitive adhesive during the heating process.

FIG. 10 is a cross sectional view of an example first alternative embodiment of a sealable enclosure 1000 before release of the strip of heat sensitive adhesive during the heating process. The sealable enclosure 1000 may be fabricated using a single sheet 1002 of packaging material. The sheet 1002 can be sealed at 1004, and then a portion of the outward extending base portion 714 may be folded to create the fold 706. The strip of heat sensitive adhesive 708 may then be added to seal the two upper fold edges 720a, 720b of the fold 706 to the film layer 704. There, the upper fold edge 720a is an edge of the base portion 714, and the upper fold edge 720b is a portion of the film layer 704 that is proximate to the edge 720a.

After the object 710 is placed on the base portion 714, the ends are sealed. Accordingly, the object 710 is sealed inside the sealable enclosure 1000 and the strip of heat sensitive adhesive 708 now acts as a barrier to contaminants from entering into the enclosure 702 via the micro-pore portion 716.

During fabrication, the micro-pore portion 716 is formed in the sheet 1002 as illustrated to facilitate venting of the gas during the heating process. As the heating process progresses, gas vents into the interior of the sealed fold 706, thereby generating outward directed forces (conceptually illustrated by the dashed arrows 802) that would tend to open the fold 706. When the temperature reaches the release temperature, the strip of heat sensitive adhesive 708 releases so that the gas may then vent out into the ambient region 712.

In an alternative embodiment, the sealable enclosure 1000 includes an intermediate layer (not shown) with at least one micro-pore portion. Such an embodiment is described above and is illustrated in FIG. 9.

Figure 11:
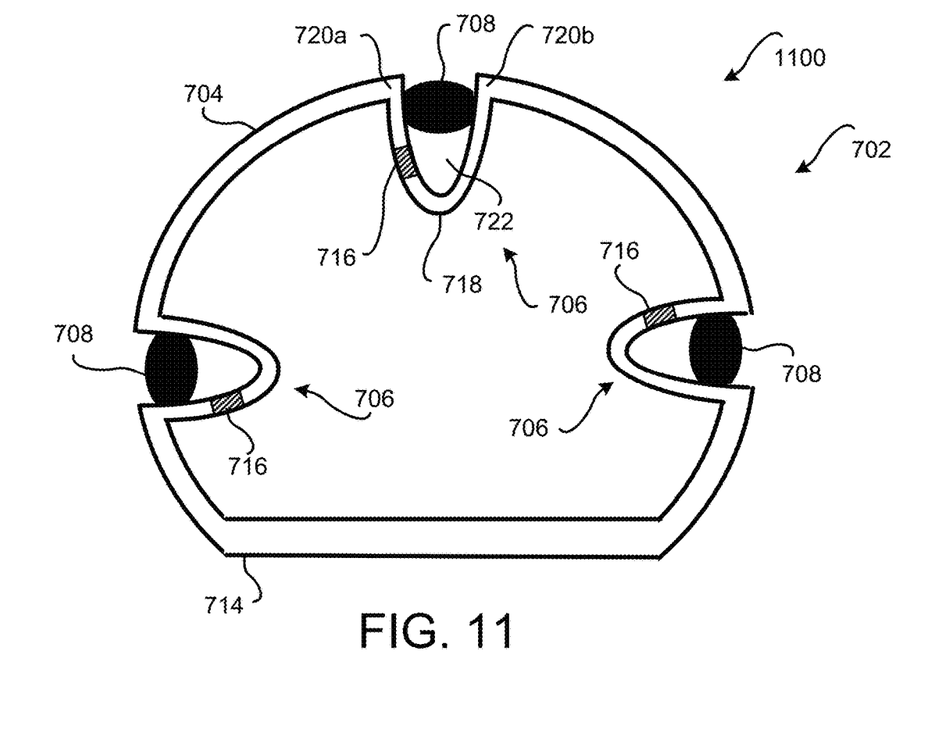
FIG. 11 is a cross sectional view of an example third alternative embodiment with a plurality of sealed folds in the film layer.

FIG. 11 is a cross sectional view of an example third alternative embodiment of the sealable enclosure 1100 with a plurality of sealed folds 706 in the film layer 704. Here, any suitable number of folds 706 may be formed into the film layer 704. The folds 706 may be of any suitable length, size, and/or shape. Each of the folds 706 are sealed with their own strip of heat sensitive adhesive 708, and each fold 706 has its their own micro-pore portion 716. The plurality of folds 706 cooperatively act together to vent gas to the ambient region 712 when the respective strip of heat sensitive adhesive 708 releases. In some embodiments, the predefined release temperature is the same for the plurality of folds 706. In other embodiments, one or more of the predefined release temperatures may be different so that selected folds 706 open at different heating temperatures.

In some applications, after the heating of the object has been completed, the generation of additional gas ceases. The sealable enclosure 700 (900, 1000, 1100) may then be moved into a cooling environment so that the sealable enclosure 700 (900, 1000, 1100) and the object 710 begin to cool. Preferably, the cooling environment is free of contaminants. Alternatively, the heat source may be removed such that the sealable enclosure 700 (900, 1000, 1100) and the object 710 therein begin to cool.

Depending upon the embodiment, the structure of the sealable enclosure 700 (900, 1000, 1100) may change as the cooling process proceeds. In one type of embodiment wherein the film layer 704 is flexible, the film layer 704 may collapse as the pressure within the enclosure 702 decreases as a result of cooling gas. Even if some contaminants do flow through the micro-pore portion 716, the sealable enclosure 700 (900, 1000, 1100) may be relocated during the cooling to a place where there are less contaminants and/or non-harmful contaminants.

In other embodiments, the fold 706 may be configured to re-close so that the strip of heat sensitive adhesive 708 may re-seal itself as it cools. Here, the strip of strip of heat sensitive adhesive 708 sealably re-joins the top of the fold 706. Accordingly, the strip of heat sensitive adhesive 708 again acts as a barrier to any contaminants reaching the object 710. Such embodiments may be particularly useful for sterilization of foods, medical instruments, or other objects.

Figure 12:
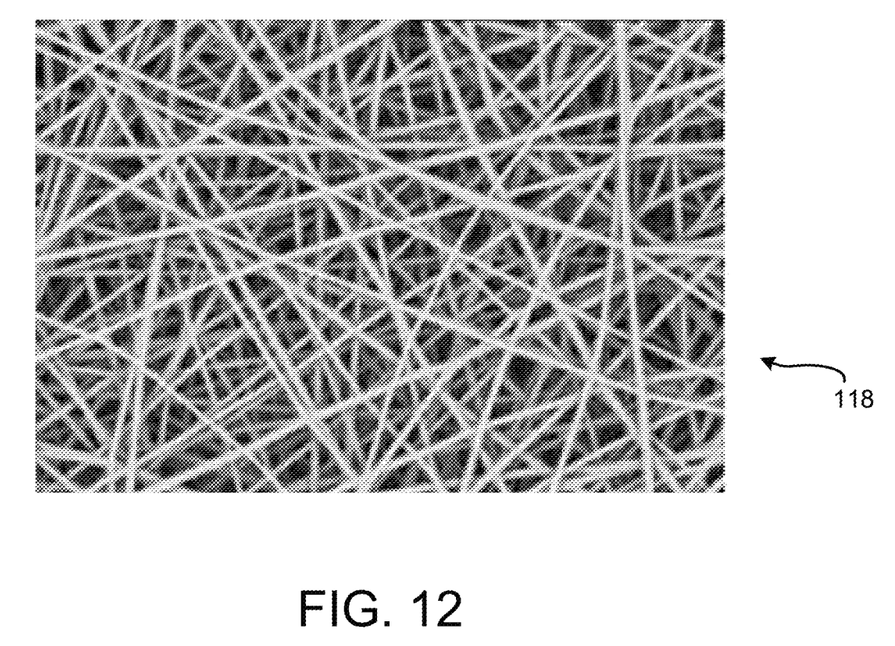
FIG. 12 is a diagram of a micro-pore fabric section constructed from a plurality of non-woven fibers.

FIG. 12 is a diagram of a micro-pore fabric section of an example micro-pore portion 118 constructed from a plurality of woven fibers and/or non-woven fibers. The random arrangement of the fiber density and/or fiber arrangement of the fibers, such as but not limited to cellulose fibers, is used to control the size of the micro-pores or the micro-pore portion 118.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method of heating an object that is enclosed within a sealable enclosure, wherein heating of the sealable enclosure with the object sealed therein permits gas generated by the heating to vent out from the sealable enclosure into an ambient region surrounding the sealable enclosure while preventing ambient contaminates in the ambient region from entering into the sealable enclosure, wherein the sealable enclosure is defined by:
   a film layer with a fold formed therein, wherein the fold is defined by a fold line and two upper fold edges;
   a strip of heat sensitive adhesive extending along a length of and is proximate to the two upper fold edges of the fold; and
   a micro-pore portion that is located in the fold of the film layer between the fold line and the strip of heat sensitive adhesive,
   wherein when a temperature of the strip of heat sensitive adhesive is less than a predefined release temperature, the strip of heat sensitive adhesive seals the two upper fold edges together to prevent ambient contaminants from entering into the sealable enclosure via the micro-pore portion;
the method comprising:
   heating the sealable enclosure with the object sealed therein, wherein gas that is initially generated within the sealable enclosure by the heating is retained within the sealable enclosure, wherein in response to the strip of heat sensitive adhesive reaching a predefined release temperature, the strip of heat sensitive adhesive releases so that the fold opens such that the gas vents out through the micro-pore portion into the surrounding ambient region while preventing ambient contaminates from entering into the sealable enclosure.

2. The method of claim 1, wherein a base portion that is sealably affixed to the film layer to form the sealable enclosure encloses the object.

3. The method of claim 2, wherein the base portion that is sealably affixed to the film layer is made of a semi-rigid to rigid material that supports the object, and wherein the film layer is made of a flexible or semi-flexible material that permits the fold to open when the strip of heat sensitive adhesive releases.

4. The method of claim 2, wherein the base portion, the film layer and the fold therein is made from a single piece of flexible or semi-flexible material that permits the fold to open when the strip of heat sensitive adhesive releases.

5. The method of claim 4, wherein the fold is formed from an end portion of the base portion such that a first one of the two upper fold edges is at an edge of the base portion and a second one of the two upper fold edges is at a proximate portion of the film layer.

6. The method of claim 1, wherein the fold with the strip of heat sensitive adhesive is a first fold with a first strip of heat sensitive adhesive that releases at a first predefined release temperature, wherein the film layer has at least one second fold formed therein, wherein the second fold is defined by the fold line and the two upper fold edges, and wherein the sealable enclosure further includes:

a second strip of heat sensitive adhesive extending along a length of and proximate to the two upper fold edges of the second fold; and a second micro-pore portion that is located in the second fold of the film layer between the fold line and the second strip of heat sensitive adhesive, wherein when a temperature of the second strip of heat sensitive adhesive is less than a second predefined release temperature, the second strip of heat sensitive adhesive seals the two upper fold edges of the second fold together to prevent ambient contaminants from entering into the sealable enclosure via the second micro-pore portion.

7. The method of claim 6, wherein the first predefined release temperature and the second predefined release temperature are different such that the first strip of heat sensitive adhesive and the second strip of heat sensitive adhesive release at different temperatures so that the first fold and the second fold open at substantially different times.

8. The method of claim 1, wherein after completion of the heating, the method further comprising:

cooling the sealable enclosure with the object sealed therein, wherein the pressure in the cavity decreases as the temperature of the gas within the cavity decreases so that the film layer collapses such that the fold closes, and wherein the strip of heat sensitive adhesive sealably re-joins the fold to form a barrier that prevents contamination of the object.

* * * * *